United States Patent [19]

Hastings

[11] Patent Number: 4,589,223
[45] Date of Patent: May 20, 1986

[54] FISHING LURE COMPOSITION

[75] Inventor: John D. Hastings, Mankato, Minn.

[73] Assignee: Johnson Fishing, Inc., Mankato, Minn.

[21] Appl. No.: 634,169

[22] Filed: Jul. 25, 1984

[51] Int. Cl.⁴ ............................................... A01K 85/00
[52] U.S. Cl. .................................... 43/42.24; 43/42.53
[58] Field of Search ................... 43/42.1, 42.24, 42.53, 43/57.1; 426/1; 524/302

[56] References Cited

U.S. PATENT DOCUMENTS

| | | | |
|---|---|---|---|
| 2,436,456 | 2/1948 | Soday | 524/302 |
| 2,500,494 | 3/1950 | Jeffers | 43/42.53 |
| 3,579,895 | 5/1971 | Orn | 43/42.53 |
| 3,747,258 | 7/1973 | Maciel | 43/57.1 |
| 3,949,511 | 4/1976 | Goldhaft | 43/57.1 X |
| 3,984,574 | 10/1976 | Comollo . | |
| 4,216,605 | 8/1980 | Showalter | 43/42.53 |
| 4,272,419 | 6/1981 | Force . | |
| 4,376,667 | 3/1982 | Beckmann . | |
| 4,377,655 | 3/1983 | Himes . | |
| 4,429,068 | 1/1984 | Nakahira | 524/302 |

FOREIGN PATENT DOCUMENTS

| | | |
|---|---|---|
| 31743 | 3/1976 | Japan . |
| 62323 | 5/1977 | Japan . |

*Primary Examiner*—Nicholas P. Godici
*Assistant Examiner*—M. Jordan

[57] ABSTRACT

An organoleptic fish attractant composition is disclosed, together with a lure and a lure kit embodying the composition, which comprises, based on the total weight of the composition, from about 10% to about 50% by weight of an effective styrene-butadiene copolymer, from about 40% to about 80% by weight fish oil having fish-attracting properties, especially cod liver oil, and an amount of an effective agricultural oil, especially a soybean oil or a palm oil, equal to at least 10% of the amount of fish oil.

10 Claims, 3 Drawing Figures

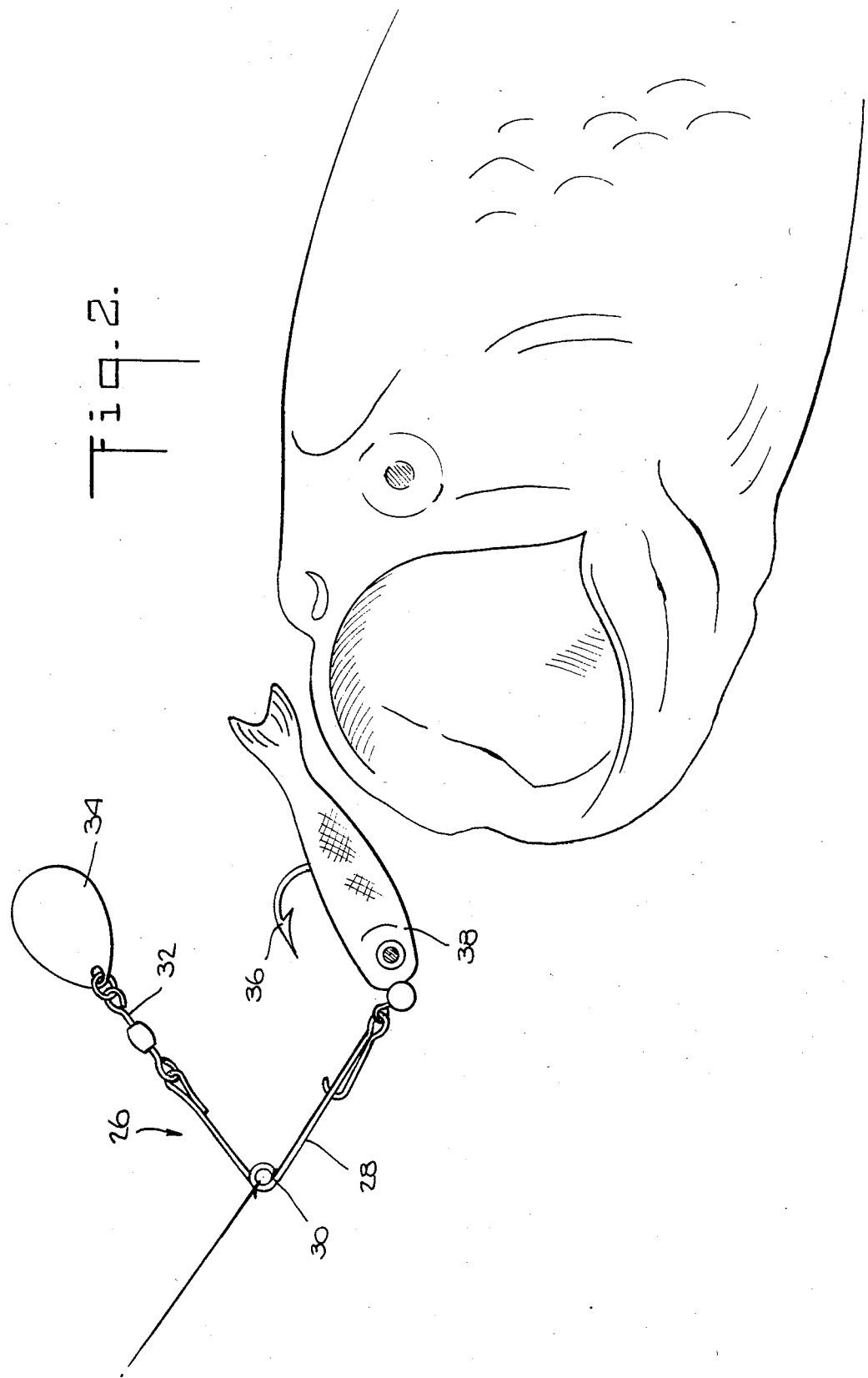

FISHING LURE COMPOSITION

BACKGROUND OF THE INVENTION

The present invention pertains generally to fish attracting devices and compositions for use in such devices, and pertains more particularly to compositions capable of attracting fish organoleptically and to fishing lures employing such compositions.

Lures designed to attract fish visually have been used for hundreds or even thousands of years. Such lures include brightly-colored devices that imitate to some extent the appearance of an insect, and devices that produce complex motions or sound patterns that attract fish when such a device is moved through water.

In addition to lures of numerous types, live bait continues to be used by many fishermen. It has long been recognized that an artificial lure which, to a fish, resembles live bait, but which can be stored and reused, would be highly desirable. Attempts to achieve such an artificial lure date back at least to the beginning of the twentieth century, with the development of rubber worms. More recently, plastic worms incorporating fruit and other scents therein have become commercially available. Soft rubber lures made of a polyvinyl chloride plastisol formulation are also available in a variety of shapes, e.g., beatles, night creatures, etc. Such formulations typically include a mechanical dispersion of rigid polyvinyl chloride, petrocarbon or organic plasticizers, any of a number of heat stabilizers, colorants and small amounts of performance additives.

SUMMARY OF THE INVENTION

The principal object of the present invention is to provide a self-supporting composition incorporating oily materials derived, at least in part, from fish, which composition is attractive to fish, and which composition is sufficiently stable to be stored for a substantial time.

Another object of the present invention is to provide a composition comprising a plastic matrix carrying oily material attractive to fish.

Another object of the present invention is to provide a lure comprising such a composition, capable of attracting fish by its organoleptic properties.

Another object of the present invention is to provide a kit including two or more lure bodies made of such a composition and a mounting device on which the lure bodies are affixed for use.

Still another object of the present invention is to provide a self-supporting, stable fish-attractant composition that is superior for use as a fishing lure to, and less costly than, polyvinyl chloride-based compositions.

In one aspect, the present invention is a composition having fish-attractant properties, and comprising: from about 10% to about 50% by weight of an effective styrene-butadiene copolymer; from about 40% to about 80% by weight of fish oil, preferably cod liver oil; and an effective agricultural oil, such as palm oil or soybean oil, in the amount of at least about 10% by weight based on the content of the fish oil. Unless otherwise indicated all units whether in parts, percent or weight are based on the total weight of the composition.

In another aspect, the present invention is a lure comprising (a) means for attracting fish visually and organoleptically, preferably a body made of the composition described hereinabove and optionally secured to a separate visual attracting means, (b) means, such as a swivel and eye, for connecting the lure to a line, and (c) means, as a hook, for securing a fish attracted by the lure.

In another aspect, the present invention is a kit comprising at least one lure having means for visually attracting fish, such as a spoon, means for connecting the lure to a line and means for securing a fish attracted by the lure, and a plurality of bodies for attracting fish by means of smell and flavor, wherein each of the bodies is made of the composition described above and is adapted to be replaceably secured to the lure.

Additional features and advantages of the present invention will be more fully understood upon a consideration of the following detailed description of the preferred embodiments thereof, taken in conjunction with the accompanying drawings, in which like reference characters refer to like elements throughout.

BRIEF DESCRIPTION OF THE FIGURES

FIG. 2 shows one preferred embodiment of a lure according to the present invention.

DETAILED DESCRIPTION OF THE PREFERRED EMBODIMENTS

Figure 1:
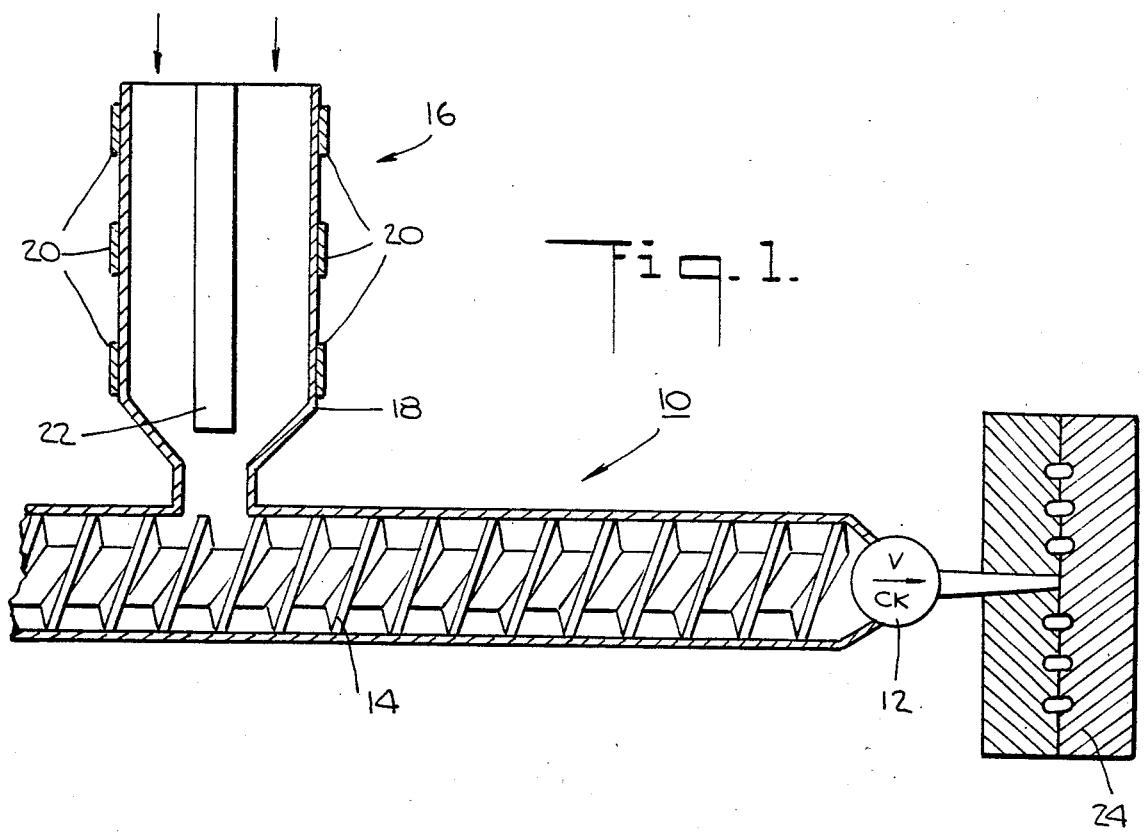
FIG. 1 is a schematic representation of apparatus for molding the composition of the invention once the composition has been produced in bulk form.

According to the present invention, a preferred embodiment of the fish attractant composition comprises a plastic containing suitable fish extract and an agricultural oil. The plastic is preferably a styrene-butadiene copolymer, the proper choice of which is important to the invention. In general the copolymer should contain 20–70 parts styrene monomer per 80–30 parts butadiene monomer and must be sufficiently dimensionally stable to resist the softening effects of oil on the polymer matrix. A preferred composition for the copolymer is about 57 parts butadiene per about 43 parts styrene. It is believed that cross-linking in such a polymer is an important factor in retaining sufficient stability and oil bearing properties. The most preferred polymer is a styrene-butadiene interpolymer sold by Firestone Synthetic Rubber and Chemical Co. under the trademark STEREON 840. That polymer has the following properties:

| | |
|---|---|
| Styrene | 43% parts by weight |
| Butadiene | 57% parts by weight |
| Specific gravity | 0.96 |
| Inherent viscosity | 0.8 |

In general, at least 10% by weight of copolymer must be included in the composition to make a matrix which is sufficiently stable. With a polymer content beyond about 50%, the composition is too rigid to be molded practically. Accordingly, the copolymer should be from about 10% to about 50% by weight of the total amount of the composition, preferably from about 15% to about 30%, and, most preferably, about 30% by weight.

In general, any available fish oil having fish attracting power can be used. Menhaden oil has been found quite satisfactory, and cod liver oil is even more potent as a fish attractant. With the exception of sardine oil, which has been found relatively ineffective, most available fish oils are believed to be acceptable to a greater or a lesser degree. The amount of fish oil ranges broadly from about 40% to about 80% by weight preferably from about 50% to about 70%, and most preferably constitutes about 57% by weight of the composition.

The third key ingredient is an effective agricultural oil. Bleached or partially hydrogenated soybean oil provides excellent results. Palm oils are also satisfactory. Other oils, such as safflower oil and peanut oil have proven less effective and are not considered satisfactory for use in the present invention. The soybean oil is employed in an amount equal to at least about 10% of the amount of cod liver oil employed. Accordingly, the soybean oil content ranges from about 4% to about 50% by weight of the composition, preferably from about 5% to about 15% by weight, and is most preferably about 6% by weight.

An optional but useful ingredient is a paraffin oil, such as a mineral oil. This ingredient acts to make the composition less tacky. Petroleum oils, other than mineral oils, tend to exude a petroleum odor, which is not attractive to fish and are unsatisfactory for this reason. If mineral oil is included, it constitutes, in general, up to about 35% by weight of the composition, preferably from about 1% to about 10%, and most preferably about 5% by weight.

Other optional ingredients include an antitack modifier such as polyethylene or polypropylene in an amount from 0 to about 20% by weight, and a heat stabilizer such as butyl zimate in an amount from 0 to about 1% by weight, especially if the composition is exposed to processing temperatures in excess of about 400° F. for over about three hours. Such a stabilizer is generally not required with the preferred copolymers.

EXAMPLE I

In order to prepare a fishing lure composition of the invention forty five pounds of cod liver oil, 6 pounds soybean oil, 5 pounds mineral oil, 0.5 pound antioxidant, Ciba Geigy Irganox 1076, octadecyl 3 (3', 5'-di-tert-butyl-4'-hydroxyphenyl) propionate, and 0.5 pound distearyl thiodipropionate, Ciba Geigy DSTDP, an antioxidant, were mixed in a closed heatable reactor. The mixture was stirred slowly from 3–10 rpm with large motor driven paddles, while being heated to 200° F. Thirty pounds of styrene-butadiene copolymer, Firestone Stereon 840, was added slowly. The temperature was then raised to 320° F. while the stirring continued. The mixture was stirred at 320° F. for 6 hours or until the solution became homogeneous. About 12 pounds cod liver oil was then added and stirred for 30 minutes at 320° F. Colorant was added and stirred until the color was uniform. The resulting molten material was then poured into shallow aluminum pans to cool.

To mold the material produced in accordance with the above procedure into the desired shape for use as a fishing line, a standard reciprocating screw in section molding machine 10 (see FIG. 1) is equipped with a positive check valve 12, such as a ball check, in place of the mound ring check valve, to prevent material from returning through the screw 14. In addition, the standard hopper is replaced with a heated torpedo type vessel 16, which is essentially a long steel tube 18 with external heater bands 20 and a heated cylinder 22 disposed inside the vessel 16, roughly along the axis thereof. Slabs of the material are removed from the shallow aluminum pans in which they have been cooled and are fed into the torpedo vessel 16. The material is preheated in the vessel 16, and is then gravity fed to the screw 14 of the molding machine 10, which molds the material like any conventional thermoplastic. The extruded material is fed into a suitable mold 24, which may, for example, shape the material to resemble a minnow or a worm, although the invention is naturally not limited to any particular shape of the lure body so produced.

EXAMPLE II

A composition was produced using the procedure set out in Example I above, but using the following ingredients in the listed proportions:

| Ingredient | Amount | Weight Percent |
|---|---|---|
| Styrene-butadiene copolymer (Firestone Stereon 840) | 30.0 lbs | 30% |
| Cod liver oil | 57.0 lbs | 58% |
| Bleached, deodorized soybean oil | 6.0 lbs | 6% |
| Mineral oil | 5.0 lbs | 5% |
| Colorant | 1.0 lbs | 1% |
| | 100.0 lbs | 100% |

The composition of Example II produces excellent results and is the most preferred mixture. As already noted, however, the invention is by no means limited to the exact ingredients or proportions of this or any other Example given herein.

It should be noted that, in practice, it is highly advantagous to use the Firestone Stereon 840 styrene-butadiene copolymer referred to in the Examples. Styrene-butadiene copolymers and other equivalent polymers are available from several sources, but because these materials are difficult to produce with consistency and vary from one another in physical properties, the fish attractant properties of the composition will vary depending upon the exact copolymer of styrene and butadiene used as the plastic matrix.

By far the best results obtained are with the indicated Stereon 840. Other styrene-butadiene copolymers have also been employed, but do not produce the same level of fish attraction. Some, for example, do not satisfactorily prevent the oils from migrating from the body of the lure. Other materials, which were utilized without effect, are crystalline non-styrenic compounds such as low density polyethylene, polypropylene and ethylene-vinyl acetate copolymer.

Heat stabilizers may be needed if prolonged high heat is applied to the mixture during preparation. The choice of these heat stabilizers, of course, is in no way critical.

It is believed that most organic dyes as well as dispersed pigments lend themselves readily and well to coloring the composition of the invention.

In evaluating the fish attractant compositions the following tests were performed on test samples. In the first test, a chunk of the composition was thrown to fish in an aquarium to see whether it would attract them.

If a sample attracted fish in the first test, then additional chunks of the sample and chunks of live bait were thrown into the same aquarium. If the sample attracted fish at least as well as the live bait, a field test was carried out.

In the field trial, the sample was formulated into a lure and fished in a pond or stream simultaneously with live bait and a control lure.

FIG. 2 is a view of one preferred embodiment of a lure according to the invention. As can be seen, the illustrated embodiment of the lure 26 of the invention comprises a wire member 28 bent to form roughly a 90° angle with an eyelet 30 at the angle for connection to a fishing line. One arm of the angle is connected by a chain 32 to a small weight 34, while the end of the other, longer arm of the angle is connected to a fish hook 36. A lure body 38 made of the composition of the invention and shaped to resemble a minnow is impaled on the hook 36, with the barb of the latter protruding from one side of the lure body 38. The lure body 38 is colored, and in combination with the movement caused by the weight 34, and possibly also light reflected from the weight 34, attracts fish visually. In addition, the composition of the lure body 38 attracts fish by means of smell and taste.

When the composition of the lure body conforms to that set out in Example II, it has been found that the organoleptic attraction is even greater than that of live bait. This, in combination with the visual attraction of the lure, provides a lure of exceptionally high quality. The inventor has found that on occasion, fish will actually attempt to eat the lure body, so great is its resemblance to real fish.

The shape and coloration of the lure body serve as a visual attractant for the fish. Preferably, additional visual attraction is provided, as in the illustrated embodiment, by motion of the lure or otherwise.

Figure 3:
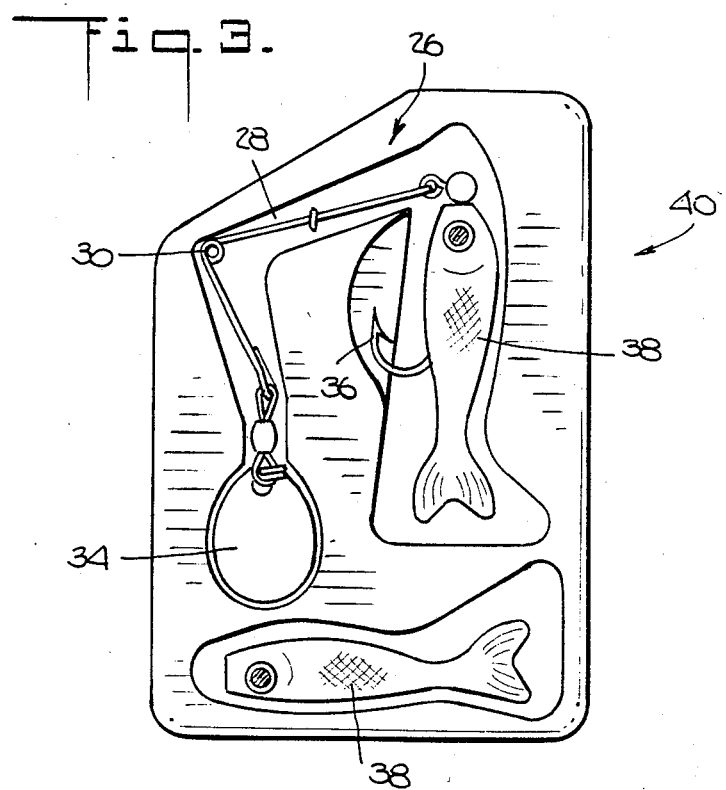
FIG. 3 is a top view of a kit according to the present invention.

FIG. 3 illustrates one version of a kit 40 according to the present invention. As can be seen, the kit includes a lure 26 like that shown in FIG. 2, with at least one additional lure body 38. If the first lure body 38 provided on the hook 36 is damaged or lost, any remnants of it can be removed from the hook and the replacement lure body 38 can be mounted in its place.

The composition of the present invention has been found to be superior to other vinyl compounds of the type commonly used for certain convention fishing lures. Specifically, the composition of the invention has a lower specific gravity than do such vinyl compounds as polyvinyl chloride, an acknowledged advantage in the this field. The composition of the invention is stronger and much more rubbery than are vinyl chloride plastisols at equivalent durometer hardnesses. In addition, the composition of the invention does not require the curing process which is used with vinyl plastisols before molding, which permits simplificaton of the processing equipment and enables the use of lower temperatures for molding. Finally, scraps of the composition of the invention can be recycled, which is not the case in all vinyl plastisol processing.

Although the present invention has been described illustratively with regard to several preferred embodiments, many modifications and variations thereof will now be apparent to those skilled in the art. Accordingly, the scope of the present invention is to be defined and limited, not by any details of the specific embodiments described herein, but only by the terms of the appended claims.

What is claimed is:

1. A fishing lure body comprising means for attracting fish visually and means for attracting fish by means of smell and taste wherein said means for attracting fish by means of smell and taste comprises a composition comprising from about 10% to about 50% by weight of an effective styrene-butadiene polymer; from about 40 to about 80% by weight of fish oil, having fish attracting properties; and an effective agricultural oil, selected from the group consisting of soybean oils and palm oils in an amount of an least about 10% based on the weight of said fish oil.

2. The fishing lure body of claim 1, wherein said copolymer is present in amounts from about 15% to about 35% by weight; said fish oil is present in amounts from about 50% to about 70% by weight; and said agricultural oil is soybean oil and is present in amounts from about 5% to about 15% by weight of said composition.

3. The fishing lure body of claim 2, wherein said copolymer is present in amounts of about 30% by weight; said fish oil is present in amounts of about 57% by weight; and said soybean oil is present in amounts of about 6% by weight.

4. The composition of claim 1, wherein said fish oil is selected from the group consisting of cod liver oil and menhaden oil.

5. The fishing lure body of claim 1, further comprising paraffin oil present in an amount from about 1% to about 5% by weight of said composition.

6. A fishing lure, comprising means for attracting fish visually and for attracting fish by means of smell and taste, means for connecting said lure to a line, and means for securing a fish attracted by said lure, wherein said fish attracting means comprises a body made of a composition comprising from about 10% to about 50% by weight of an effective styrene-butadiene copolymer, from about 40% to about 80% by weight of fish oil having fish-attracting properties, wherein said weights are based on the total weight of said composition, and an effective agricultural oil, selected from the group consisting of soybean oils and palm oils, in an amount of at least about 10% by weight based on the amount of said fish oil.

7. The lure of claim 6, wherein said copolymer is employed in amounts from about 15% to about 35% by weight, said fish oil is employed in amounts from about 50% to about 70% by weight and said agricultural oil is soybean oil and is employed in amounts from about 5% to about 15% by weight of said composition.

8. The lure of claim 7, wherein said copolymer is about 30% by weight, said fish oil is about 57% by weight, and said soybean oil is about 6% by weight of said composition.

9. The lure of claim 6, wherein said composition further comprises paraffin oil in an amount from about 1% to about 5% by weight of said composition.

10. The lure of claim 6, wherein said fish oil is selected from the group consisting of cod liver oil and menhaden oil.

* * * * *